(12) United States Patent
Wetzel

(10) Patent No.: US 6,388,990 B1
(45) Date of Patent: May 14, 2002

(54) METHOD AND SYSTEM FOR REDUCING CONGESTION IN CONNECTION-ORIENTED PACKET NETWORKS HAVING DIGITAL SUBSCRIBER LINE ACCESS

(75) Inventor: Gregory F. Wetzel, San Jose, CA (US)

(73) Assignee: Covad Communications Company, Santa Clara, CA (US)

( * ) Notice: Subject to any disclaimer, the term of this patent is extended or adjusted under 35 U.S.C. 154(b) by 0 days.

(21) Appl. No.: 09/216,081

(22) Filed: Dec. 18, 1998

(51) Int. Cl.[7] .................. G01R 31/08; G06F 11/00; H04J 1/16; H04L 1/00; H04L 12/66
(52) U.S. Cl. ........................ 370/230; 370/355
(58) Field of Search ............. 370/483, 420, 370/468, 522, 525, 229, 230, 232, 233, 235, 236, 351, 352, 353, 354, 400, 401, 465, 355, 357, 395.65, 395.1; 375/219, 220, 222

(56) References Cited

U.S. PATENT DOCUMENTS

| | | | | |
|---|---|---|---|---|
| 5,627,836 A | * | 5/1997 | Conoscenti et al. | 370/397 |
| 5,682,419 A | * | 10/1997 | Grube et al. | 370/487 |
| 5,751,701 A | * | 5/1998 | Langberg et al. | 370/281 |
| 5,905,781 A | * | 5/1999 | McHale et al. | 379/93.14 |
| 5,953,318 A | * | 9/1999 | Nattkemper et al. | 370/236 |
| 6,044,403 A | * | 3/2000 | Gerszberg et al. | 709/225 |
| 6,049,531 A | * | 4/2000 | Roy | 370/260 |
| 6,130,879 A | * | 10/2000 | Liu | 370/230 |
| 6,160,810 A | * | 12/2000 | Brodigan | 370/395 |

* cited by examiner

Primary Examiner—Kwang Bin Yao
Assistant Examiner—Kevin C. Harper
(74) Attorney, Agent, or Firm—Jung-hua Kuo

(57) ABSTRACT

A method and system for provisioning remote user data access over digital subscriber lines (DSL's) through connection-oriented packet networks is described. According to a preferred embodiment, DSL terminal units are directed to train at a rate that is not substantially greater than the subscribed data rate, thereby avoiding network congestion due to data rate mismatches between the DSL connection and a corresponding permanent virtual circuit (PVC) channel through the connection-oriented packet network. According to another preferred embodiment, the DSL units are directed to test for the maximum trainable data rate before settling to the subscribed data rate, and to communicate this information to a network operations center computer, thereby allowing the maximum allowable DSL data rate to be compared to actual client traffic usage patterns and to the client's subscribed data rate. According to another preferred embodiment, in the event that the maximum trainable rate lies substantially below the subscribed data rate, the network operations center automatically re-provisions the permanent virtual circuit (PVC) channel through the connection-oriented packet network to a corresponding lower level, thereby conserving network resources.

15 Claims, 6 Drawing Sheets

METHOD AND SYSTEM FOR REDUCING CONGESTION IN CONNECTION-ORIENTED PACKET NETWORKS HAVING DIGITAL SUBSCRIBER LINE ACCESS

FIELD OF THE INVENTION

The present invention relates to the field of digital communications. In particular, the present invention relates to an optimal method for provisioning a high-speed data connection between a user and a destination over a connection-oriented packet network having digital subscriber line access to the user premises.

BACKGROUND OF THE INVENTION

With the explosive growth of the Internet and with the increasing desirability of telecommuting, the need for more reliable and higher speed data access over the "last mile" to homes and small businesses has become apparent. In particular, it has become desirable to provide high-speed data communications (1) between remote users, such as users at homes or small businesses, and corporate networks for telecommuting purposes, and (2) between remote users and the Internet. A traditional method of remote user access, and still the most common, involves the use of two-wire modems, such as V.90 modems, to establish a dial-up connection between the remote user and their company's dial-in server, or between the remote user and their Internet Service Provider (ISP). Although still having certain cost advantages, the traditional dial-up modem has many practical disadvantages including dial-up delay and including a limited data access rate, which is currently 56 Kbps for V.90 modems.

FIG. 1 shows a block diagram of an emerging technology and service solution that provides numerous advantages over traditional remote access methods. FIG. 1 shows a connection-oriented packet network 100 for providing a connection between a remote user and a destination where a DSL (Digital Subscriber Line) link is used to access the remote user premises. As used herein, "remote user" indicates a customer at a home, small business, or other location whose primary method of data connection to the outside world is through ordinary telephone system "last mile" copper connections to the telephone company central office (CO).

As known in the art, connection-oriented protocols rely on end-to-end connections through virtual circuits. The virtual circuits are either Permanent Virtual Circuits (PVC's) that are permanently "nailed up", or Switched Virtual Circuits (SVC's) that are established on a per-call basis. In a connection-oriented protocol, successive packets travel from the source to the destination over the same path, whereas for connectionless protocols each individual packet finds its own way through the network to its destination. Examples of connection-oriented protocols include Asynchronous Transfer Mode (ATM), Frame Relay, and X.25 Virtual Circuit Mode. Examples of connectionless protocols include the Internet Protocol (IP), X.25 Datagram Mode, and SMDS (Switched Multimegabit Data Service).

From a connectivity and throughput perspective relevant to the remote access network of FIG. 1, the newer connection-oriented protocols such as Frame Relay and ATM are advantageous for reasons including (a) higher data rates over the newer and more reliable hardware that is now available, as compared to connectionless lower-level protocols, and (b) the opportunity to define specific grades of service, such as CIR (Committed Information Rate) for Frame Relay and QoS (Quality of Service) metrics for ATM. See generally McDysan and Spohn, ATM: *Theory and Application, Signature Edition,* McGraw-Hill Series on Computer Communications (1998), the contents of which are hereby incorporated by reference into the present disclosure.

As known in the art, DSL technology affords the opportunity to establish high bit rate access over ordinary copper lines between remote user premises and the telephone company CO. DSL technology has been described as creating high-speed "dumb pipes" over ordinary copper lines, allowing high bandwidth to remote users at reduced cost. See K. Taylor, "Converting Copper: How xDSL Paves the Way for ATM", in Gadecki and Heckart, ATM . . . , IDG Books Worldwide (1997) at pp. 91–93. The contents of the Gadecki and Keckart text are are hereby incorporated by reference into the present disclosure.

DSL technology, often named xDSL technology, comes in several different variations. High Bit Rate DSL (HDSL) is the oldest DSL technology, which arose from problems in transmitting T1 (1.544 Mbps) over long copper loops, offers symmetric (same speed both ways) data rates up to 1.544 Mbps in a 4-wire implementation, and up to 768 Kbps in 2-wire implementations. Symmetric DSL (SDSL) offers, in a single 2-wire implementation, a symmetric data rate of up to 1.1 Mbps and even 1.544 Mbps in light of recent improvements. Asymmetric DSL (ADSL) offers, in a single 2-wire implementation, the combination of a high-speed downstream channel that can deliver a one-way downstream rate of 1.5–8 Mbps to the remote user, along with a duplex channel that can deliver a symmetric data rate of up to 640 Kbps. Other types of DSL services have emerged including Rate Adaptive DSL (RADSL), ISDN DSL (IDSL), and Very High-Speed DSL (VDSL). See generally Chen, DSL: *Simulation Techniques and Standards Development for Digital Subscriber Line Systems,* MacMillan Technology Series (1998), the contents of which are hereby incorporated by reference into the present disclosure.

As shown in FIG. 1, the connection-oriented packet network 100 provides connectivity between a remote user or client premise 102, such as a home or small business, and a corporate LAN 104. Alternatively, or in conjunction therewith, the connection-oriented packet network 100 provides connectivity between the client premise 102 and the Internet 106 via ISP 108. As used herein, for simplicity and clarity of disclosure, the remote user is denoted as the "client" of the remote data access service. It is to be appreciated that the "customer" of the remote data access service of FIG. 1, i.e. the party that requests the service and pays the service invoices, may actually be the client, the client's employer, the ISP, or a different party depending on bundling, reselling, or other business and marketing factors. Unless otherwise indicated herein, and for purposes of clarity of disclosure and not by way of limitation, the "client" shall correspond to a single entity at the remote user premise who requests, uses, and pays the remote data access service of FIG. 1.

In the case of the corporate LAN 104 as the destination, the connection-oriented packet network 100 provides a permanent virtual circuit (PVC) between the client premise 102 and the corporate LAN 104. Physically, (1) a DSL link 110 is provided between the client premise 102 to the CO 112, (2) a standard Time Division Multiplexed (TDM) link 114 (e.g., DS-3 or STS-3c) is provided between the CO 112 to an ATM network switch 116 of an ATM Network 118, (3) facilities of ATM Network 118 are provided between ATM network switch 116 and an ATM network switch 120 near the corporate LAN 104, and (4) a standard TDM link 122 (e.g., DS-1 or DS-3) is provided between ATM network switch 120 and the corporate LAN 104. The DSL link 110 is provisioned between (a) a remote DSL terminal unit 132 such as a DSL modem at the client premise 102, and (b) a CO DSL terminal unit 134 such as a DSL Access Multiplexer at the CO 112. The TDM link 122 between ATM network switch 120 and the corporate LAN 104 terminates at a router 107 at the corporate site.

Using the above facilities, in FIG. 1 an ATM circuit is provisioned between remote DSL terminal unit 132 and router 107, traversing the DSL link 110, the CO DSL terminal unit 134, the TDM link 114, the ATM switch 116, the ATM Network 118, the ATM switch 120, and the TDM link 122. For purposes of disclosing features and advantages of the preferred embodiments infra, the portion of the ATM circuit between the remote DSL terminal unit 132 and the CO DSL terminal unit 134 may be referred to as a digital subscriber line portion, while the portion of the ATM circuit between the CO DSL terminal unit 134 and the router 107 may be referred to as a connection oriented packet network portion.

In the case of the ISP 108 as the destination, the connection-oriented packet network 100 provides a similar PVC except that connectivity is provided between the ATM network switch 116 and a different ATM network switch 124 closer to the ISP 108 over a TDM link 126 to ISP 108. The TDM link 126 terminates at a router (not shown) at ISP 108 which provides connectivity to the Internet 106. Thus, in this case, an ATM circuit is provisioned between remote DSL terminal unit 132 and a router at ISP 108, traversing the DSL link 110, the CO DSL terminal unit 134, the TDM link 114, the ATM switch 116, the ATM Network 118, the ATM switch 124, and the TDM link 126.

It is to be appreciated, of course, that the router 107 at the interface to the corporate network, as well as the router (not shown) at the interface to ISP 108, represent endpoints of the connection-oriented packet network 100. The Internet 106 and LAN 104 are not in themselves part of the connection-oriented packet network 100. It is to be further appreciated that the ATM Network 118 is exemplary of a network that provides PVC and SVC services, but may contain, in whole or in part, portions that use a different connection-oriented protocol such as Frame Relay without departing from the scope of the preferred embodiments.

The connection-oriented packet network 100 of FIG. 1 is similar to a currently available service named TeleSpeed® offered by Covad Communications, the assignee of the present invention. As described on the Covad web site www.covad.com, the entirety of which is hereby incorporated by reference into the present disclosure as of the filing date, exemplary TeleSpeed® subscription services include: TeleSpeed® 144, which uses an IDSL connection between the customer premise and the CO that allows a symmetric 144 Kbps data rate, TeleSpeed® 192, which uses an SDSL connection between the customer premise and the CO that allows a symmetric 192 Kbps data rate; TeleSpeed® 384, which uses an SDSL connection for a symmetric 384 Kbps data rate; TeleSpeed® 768, which uses an SDSL connection for a symmetric 768 Kbps data rate; TeleSpeed® 1.1, which uses an SDSL connection for a symmetric 1.1 Mbps data rate; and TeleSpeede® 1.5, which uses an ADSL connection for offering of a downstream channel of up to 1.5 Mbps in combination with an upstream channel of up to 384 Kbps. It is to be appreciated, however, that the scope of the preferred embodiments is not limited to such implementations. For purposes of the present disclosure, the providers of high speed remote access using digital subscriber lines through connection-oriented packet networks, such as Covad Communications, may generically be referred to as end-to-end service providers.

As shown in FIG. 1, the client premise 102 usually contains one or more client computers, two such client computers 128 and 130 being shown in FIG. 1. Client computers 128 and 130 are each equipped with LAN access equipment such as 10BaseT Ethernet cards (not shown) for coupling to a client LAN 113. Any of a variety of protocols may be used for establishing data communications among client computers 110 and 112 over client LAN 113, including standardized protocols such as TCP/IP over Ethernet, proprietary protocols such as Novell IPX, or other protocols.

Connection-oriented packet network 100 comprises a DSL link 110 between a remote DSL terminal unit 132 and a CO DSL terminal unit 134. Remote DSL terminal unit 132 is coupled to the user LAN 113. The type of DSL terminal units 132 and 134 that are used will depend on the subscribed service and the type of equipment on the user LAN 113. For example, in the case of TeleSpeed® 144 service from Covad Communications, remote DSL terminal unit 132 may be an Ascend Pipeline 50/75, a Cisco 700 series router, a Cisco 1604 router, or a Flowpoint 144 router, while the CO DSL terminal unit 134 may be a Cisco 90i IDSL Channel Unit. In the case of TeleSpeed® 192, 384, 768, or 1.1 service from Covad Communications, remote DSL terminal unit 132 may be a FlowPoint 2200 SDSL router. In the case of TeleSpeed® 1.5 service from Covad Communications, remote DSL terminal unit 132 may be a Flowpoint 2100 ADSL router. CO DSL terminal unit 134 may be a Diamond Lane DSL Access Multiplexer. It is to be appreciated, of course, that the above exemplary equipment is listed for completeness of disclosure and so as not to cloud the features and advantages of the preferred embodiments. As line speeds increase and/or other technological advances are made, the implementations may use different equipment without departing from the scope of the preferred embodiments.

It is also to be appreciated that remote user premise 102 is one of tens, hundreds, or even thousands of client premises that may be connected over DSL lines similar to DSL line 110 for termination at the telephone company CO 112. Accordingly, the CO DSL terminal unit 134 may be one of many such units at the CO 112, and each CO DSL terminal unit may be coupled to several DSL lines depending on its capabilities. For simplicity and clarity of disclosure, however, only one such DSL line 110, remote DSL terminal unit 132, and CO DSL terminal unit is shown in FIG. 1.

At the telephone company CO 112, the network sides of the multiple DSL lines are multiplexed onto a high-capacity transmission line using, for example, a DSL Access Multiplexer for providing an ATM protocol connection between the DSL lines and the ATM network switch 116. The ATM network switch 116 may be, for example, a Cisco BPX® ATM switch. Between the ATM network and the corporate LAN 104 or ISP 108, data packets are delivered in accordance with the appropriate protocols, the details of which are beyond the scope of the present disclosure but which are described, at least in part, in the McDysan and Spohn text supra.

Provisioning refers to the process of configuring hardware and software to establish a virtual circuit between the client premise and the destination. Provisioning includes the process of establishing the DSL link 110 between the client premise 102 and the CO 112, as well as the process of establishing a virtual circuit between the CO 112 and the destination. In the case of permanent or "nailed up" data connections, as is the case with the exemplary TeleSpeed® services described supra, the service remains in its provisioned configuration unless changes occur. Such changes include, but are not limited to, interruptions in the ATM network such as link outages, interruptions in the DSL line such as the inadvertent unplugging of the client DSL unit, and maintenance interruptions in either portion. Upon such occurrences, the ATM network is designed to automatically reroute traffic and/or reestablish PVC connections, and the DSL units are designed to automatically re-train to establish DSL connectivity as soon as possible.

A problem occurs in the remote user data access network of FIG. 1 due to present-day provisioning processes. In particular, in prior art provisioning processes the DSL terminal units are configured to train at the highest obtainable speed, independent of the rate that is subscribed to by the customer. Often, the actual trained data rate between the DSL terminal units is much higher than the subscribed rate, simply because the facilities between the customer premise and the CO allow this higher trained rate to happen. As an example, it has been observed in some circumstances that the DSL terminal units will train as high as several megabits per second (Mbps), even though the subscribed rate was only 384 Kbps. However, the ATM network has only provisioned 384 Kbps for that remote user's PVC. In this case, unwanted congestion can occur between the CO DSL terminal unit and the ATM network switch during bursts of data greater than the subscribed rate of 384 Kbps.

As described in ATM: *Theory and Application,* supra, at Chapter 23, the ATM protocol is designed to respond to the unwanted congestion through various means, which may include the invocation of Selective Cell Discard, i.e. the "bit-bucketing" of lower priority cells. Although higher-level protocols will ensure overall data integrity, e.g. by requesting re-send of the data by the client and/or destination computers, the overall efficiency of the end-to-end network is compromised, and a lower overall throughput may result.

FIG. 2 shows a diagram of a training sequence between DSL terminal units that causes the above congestion problem in prior art implementations of remote user access over DSL through connection-oriented packet networks. FIG. 2 shows a generic user DSL Modem 232 located at the remote user premises coupled to a generic DSL Access Multiplexer 234 located at the CO. In the example of FIG. 2, an SDSL symmetric connection of 384 Kbps is provisioned. In accordance with the prior art, the exemplary DSL Access Multiplexer 234 is capable of training to speeds 300, 400, 500, 600, 700, and so on, up to a maximum of several Mbps. The speeds 300, 400, 500, etc. represent the speed increments at which the DSL Access Multiplexer 234 can train. Due to hardware considerations, typical DSL Access Multiplexers 234 are incapable of training at speeds that lie between these speed increments. The user DSL Modem 232 is programmed to attempt to train at whatever speed attempted by the DSL Access Multiplexer 234. It is to be appreciated that the specific numbers 300, 400, 500, etc. used in this example were selected for clarity of disclosure, and are not intended to precisely represent the actual training speed steps of the existing physical devices. Actual training speeds of the existing physical devices vary depending on brand and other factors, but will generally vary in a manner analogous to this example.

In accordance with this prior art example, when the SDSL connection is first established, the DSL Access Multiplexer 234 will first attempt to train with the user DSL Modem 232 at the lowest data rate, that is, 300 Kbps. If copper facility conditions and loop length allow successful training with user DSL Modem 232 at 300 Kbps, then DSL Access Multiplexer 234 will increase the attempted training rate to the next speed increment, 400 Kbps. If successful, i.e. if copper facility conditions and loop length allow training with user DSL Modem 232 at 400 Kbps, then DSL Access Multiplexer 234 will increase the attempted training rate to the next level, 500 Kbps, and so on until the increase in attempted training speed causes training failure. Such a failure level is shown as 700 Kbps in FIG. 2. In this case, the DSL Access Multiplexer 234 and the DSL Modem 232 "settle" on a training rate of 600 Kbps.

Disadvantageously, in this prior art example where the DSL terminal units have trained at 600 Kbps, which is substantially higher than the subscribed rate of 384 Kbps, problems can occur. In particular, if the client transmits a substantially long burst of data at, say, 550 Kbps, then the ATM network will respond with congestion recovery measures, because it has only provisioned 384 Kbps for that PVC. These congestion recovery measures can include the "bit bucketing" described above, which results in retransmission requests from the higher order protocols and reduced end-to-end efficiency of the network.

Accordingly, it would be desirable to provision data access over DSL through connection-oriented packet networks, such that network congestion due to data rate mismatches between the DSL connection and the provisioned PVC channel is minimized.

It would further be desirable to provision data access over DSL through connection-oriented packet networks, such that enhanced services may be offered to the remote user in the event that the DSL connection is capable of training at a data rate substantially greater than the subscribed rate, based upon automatically learned knowledge of the difference between the maximum actual trainable DSL rate and the subscribed rate.

It would be even further desirable to provision data access over DSL through connection-oriented packet networks, such that resources in the connection-oriented packet network may be more efficiently utilized in the event that the actual trained DSL rate is substantially less than the subscribed rate provisioned rate.

It would be even further desirable to provision data access over DSL through connection-oriented packet networks, such that differences in available speed increments between the DSL link and the provisioned PVC channel are accommodated in a manner that does not "punish" the remote user by excessively discarding cells during periodic bursts of data at speeds lying between respective speed increments.

SUMMARY OF THE INVENTION

In accordance with a preferred embodiment, a method and system for provisioning remote user data access over DSL through connection-oriented packet networks is provided, wherein the DSL terminal units associated with the DSL link are directed to train at a rate that is not substantially greater than a subscribed data rate. In this manner, network congestion due to data rate mismatches between the DSL connection and the corresponding PVC channel through the connection-oriented packet network is minimized or avoided.

According to another preferred embodiment, a provisioning process is provided wherein the DSL terminal units are directed to test for the maximum trainable data rate before settling to a trained data rate not substantially greater than the subscribed data rate, and to communicate the maximum trainable data rate to a network operations center computer. In this manner, the maximum allowable DSL data rate to each specific client premise is known by the network operations center, and can advantageously be used by the end-to-end service provider. For example, the maximum allowable DSL data rate may be compared to the client's subscribed data rate and to the client's actual traffic usage patterns, permitting enhanced services to be offered to the client by marketing personnel when appropriate. As another example, knowledge of the maximum allowable DSL data rates for a plurality of client premises may be used for facility routing and community data planning applications, and may be sold to digital content providers as valuable marketing data.

According to another preferred embodiment, in the event that the maximum trainable rate between DSL terminal units lies substantially below the subscribed data rate, the network operations center causes the automatic re-provisioning of the permanent virtual circuit (PVC) channel through the connection-oriented packet network such that the resulting PVC has a corresponding data rate lower than the subscribed data rate. In this manner, bandwidth that would otherwise go unused is released for allocation to other ATM channels, thereby conserving network resources and enhancing network efficiency.

DETAILED DESCRIPTION

Figure 3:
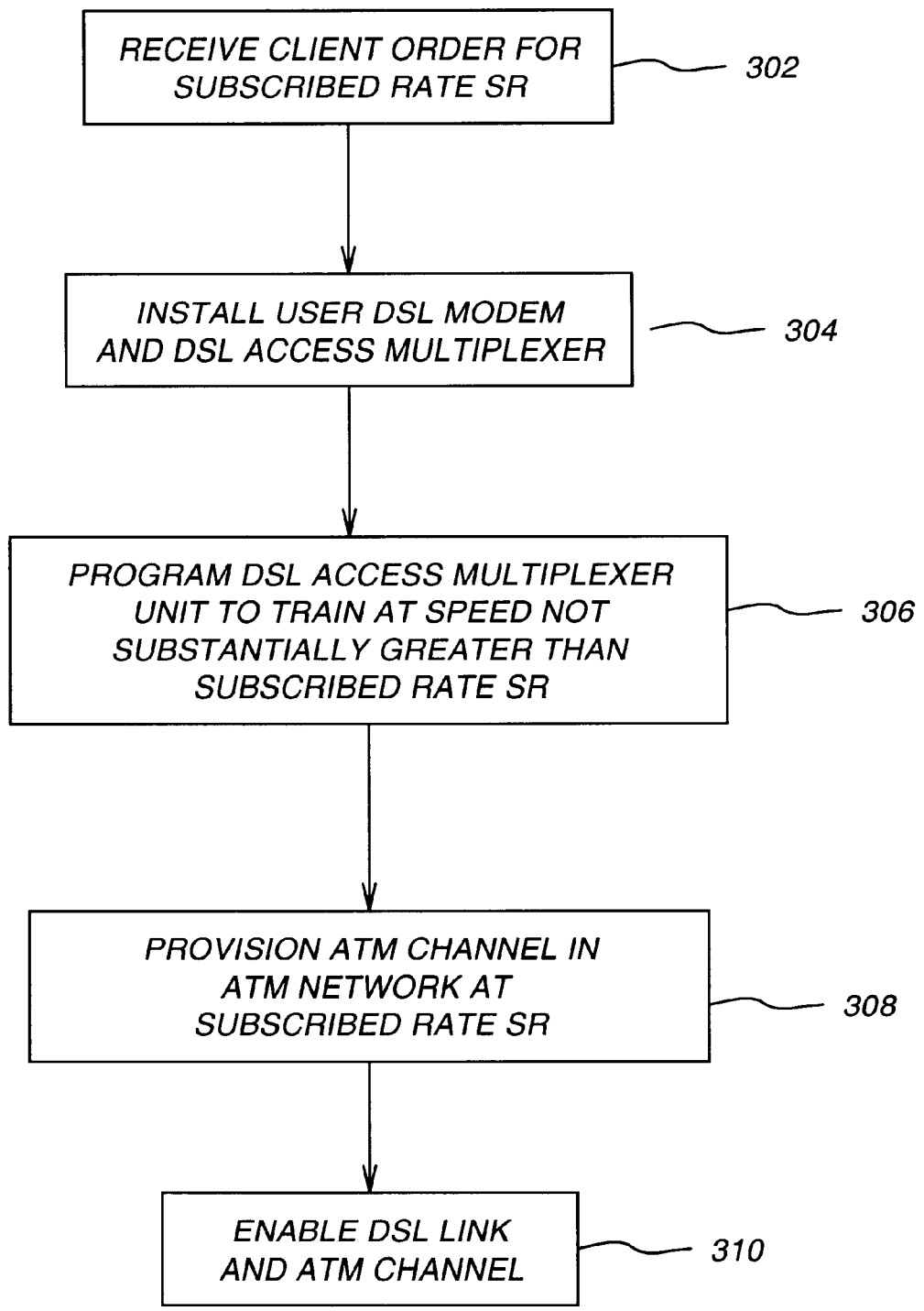
FIG. 3 shows steps for provisioning data access over digital subscriber line through a connection-oriented packet network in accordance with a preferred embodiment.

FIG. 3 shows steps for provisioning data access over a digital subscriber line through a connection-oriented packet network in accordance with a preferred embodiment. At step 302, the client order is received for remote user access at a subscribed rate (SR). The subscribed rate SR will depend primarily on the marketing strategy and physical plant available to the end-to-end service provider as communicated to the client in advertising material, service orders, customer relations sessions, and so forth. Importantly, neither the client nor the end-to-end service provider is aware of the exact maximum DSL link data rate that will be permitted by the copper facilities between the client premise 102 and the CO 112. Generally speaking, however, the end-to-end service provider will expect the maximum DSL link data rate to be greater than the subscribed rate SR, or else such rate would not have been offered for sale. If, in fact, the subscribed rate SR is not achievable, a renegotiation of the subscription rate will usually be offered to the customer.

Figure 2:
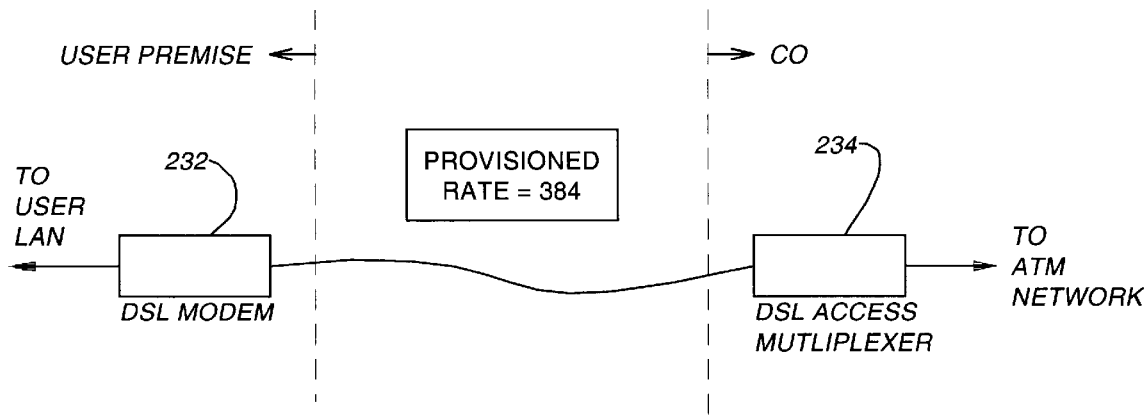
FIG. 2 shows a diagram of a training sequence between two digital subscriber line terminal units.
Figure 2:
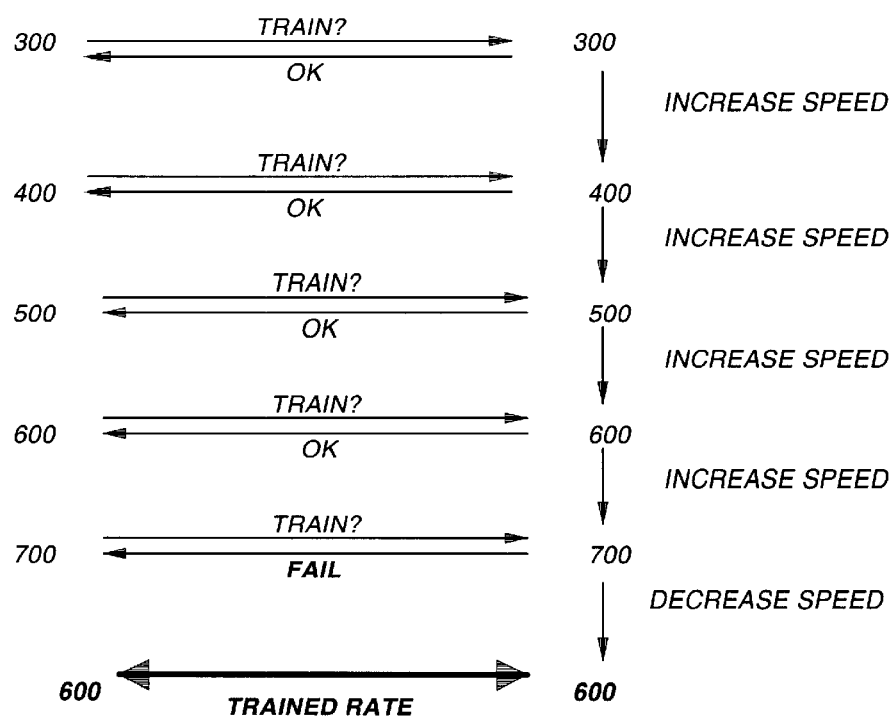

At step 304, the physical plant including the client remote DSL terminal unit 132 and the CO DSL terminal unit 134 (or, more particularly, the DSL Modem 232 at the client premises and DSL Access Multiplexer 234 at the CO as shown in FIG. 2) are physically installed using methods known in the art. For example, the DSL Modem 232 will be programmed at the customer premises to have certain transmission parameters through a management link to a Network Operations Center NOC or through a direct link such as an RS-232 interface to a field technician. Likewise, the DSL Access Multiplexer 234 will be programmed at the CO to have certain transmission parameters, through a standard RS-232 interface to a technician laptop computer or through a management link to the NOC. Alternatively, the DSL Modem 232 and DSL Access Multiplexer 234 are simply installed using the default parameters that are programmed at the factory, and are not modified by the installation technician. As discussed supra, in prior art systems among the default settings are generally (a) for the DSL Access Multiplexer 234, to the train at the highest possible speed increment, and (b) for the DSL Modem 232, attempt to train at whatever speed attempted by the DSL Access Multiplexer 234.

At step 306, in accordance with a preferred embodiment, the DSL Access Multiplexer 234 is programmed to train at a speed that is not substantially higher than the subscribed rate SR. Because the subscribed rate SR will depend on the specific customer and the specific end-to-end service provider, this programming is to be performed by the installation technician at the CO or by the NOC through the management link, and is not custom-programmed at the equipment factory, although the scope of the preferred embodiments is not so limited. Thus, for example, the end-to-end service provider may maintain an inventory of DSL Access Multiplexers that are pre-programmed to different speed increments without departing from the scope of the preferred embodiments.

Figure 1:
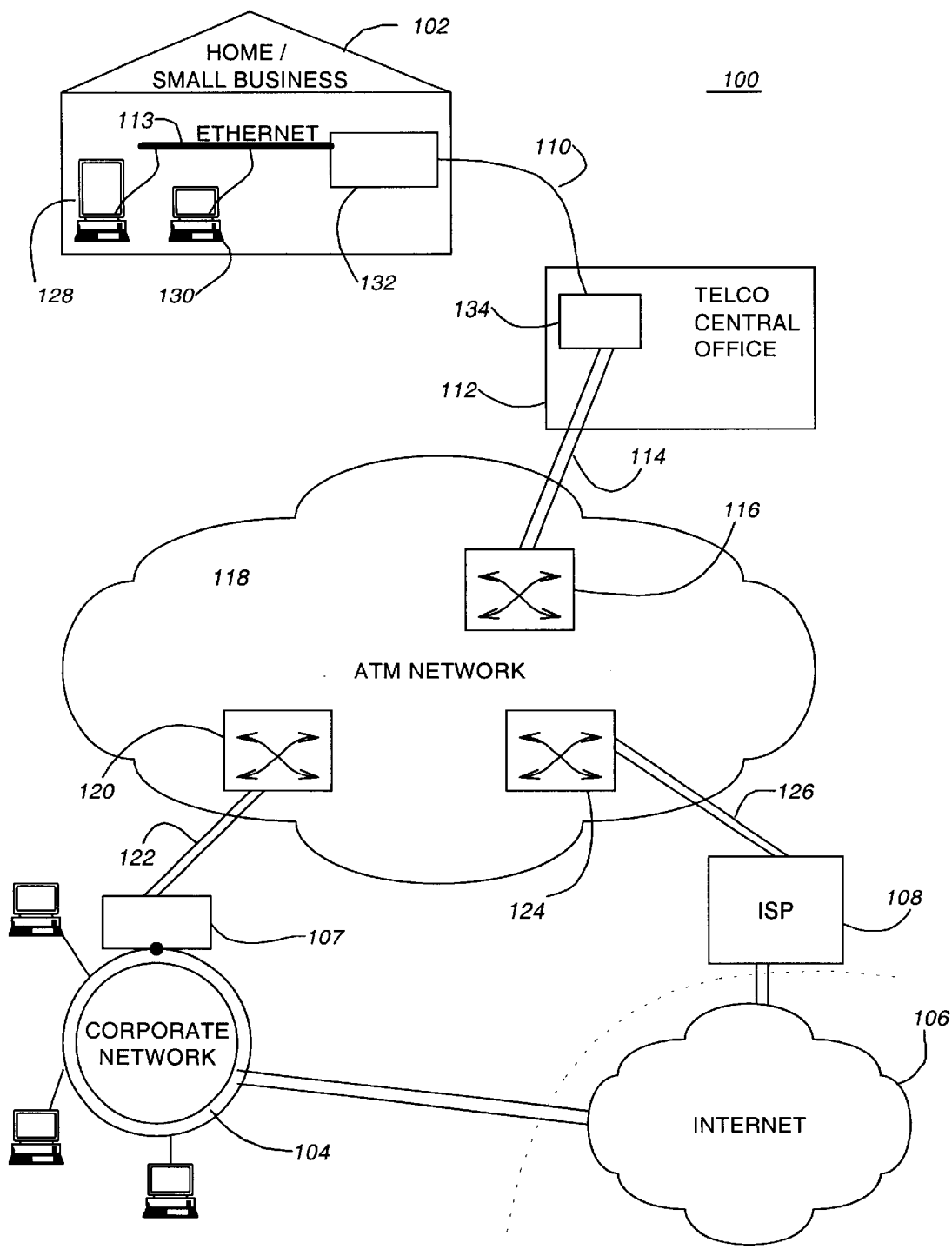
FIG. 1 shows a connection-oriented packet network for providing a connection between a remote user and a destination where a digital subscriber line link is used to access the remote user premises.

By way of example, and not by way of limitation, the subscribed rate SR may be selected by the client as 384 Kbps. The speed increments for the specific DSL Access Multiplexer 234, which corresponds to CO DSL terminal unit 134 of FIG. 1, may be 100, 200 Kbps, 300 Kbps, 400 Kbps, 500 Kbps, etc., up to a maximum of several Mbps. In accordance with a preferred embodiment, the DSL Access Multiplexer 234 will be programmed to train at 400 Kbps. Although 400 Kbps is higher than the subscribed rate of 384 Kbps, it is not substantially higher in that it represents the next DSL speed increment available, and any occurring bursts of data at 400 Kbps are not expected to cause significant congestion in the ATM link 114 and ATM network 118. Nevertheless, the probability exists that congestion may occur in the ATM link 114 and ATM network 118 because of bursts of data between 384 Kbps and 400 Kbps, an issue which is addressed in another preferred embodiment infra.

It is to be appreciated that the selection of a training speed not substantially higher than the subscribed rate SR may involve a choice between the first DSL speed increment less than SR (300 Kbps in the above example) and the first DSL speed increment greater than SR (400 Kbps in the above example). Each selection would have its own advantages and disadvantages, and represents a tradeoff in performance. If 400 Kbps is chosen as the training speed, the client will generally enjoy the full 384 Kbps bandwidth, but may experience congestion problems when sending extended bursts between 384 Kbps and 400 Kbps causing retransmission delays in the higher protocol layers that may result in a throughput far less than 384 Kbps at those times. In contrast, if 300 Kbps is chosen as the training speed, the client will not experience the above congestion problems but is, of course, limited to the lower 300 Kbps speed. While tradeoffs exist between the two choices, it is to be appreciated, that the selection of either 300 Kbps or 400 Kbps in this example represents a selection of a training speed not substantially higher than the subscribed rate SR in accordance with a preferred embodiment.

It may occur, of course, that there is precise correlation between the subscribed rate SR and the speed increments for the DSL terminal unit. Thus, using the above subscribed rate SR of 384 Mbps for a hypothetical DSL terminal unit that offers speed increments of 184, 284, 384, 484, 584, etc., the appropriate selected DSL training speed that is not substantially higher than the subscribed rate SR would be 384 Mbps.

At step 308, the ATM channel (that is, the permanent virtual circuit established using the ATM protocol) involving the DSL Modem 232, the DSL Access Multiplexer 234, and the ATM network 118 is provisioned using methods known in the art. As known in the art, the specific definition of the traffic parameters and QoS parameters for the ATM channel will depend on the specific network equipment providers, although general interoperability standards are provided by standards organizations and industry forums (e.g., the ITU-T, ATM Forum). Generally speaking, the traffic descriptors for the ATM channel will include: a Peak Cell Rate (PCR), the reciprocal of the time between the first bit of one cell to the first bit of the next cell; the Cell Delay Variation (CDV) Tolerance, the variation from the nominal per-cell time spacing that the source may transmit; the Maximum Burst Size (MBS), the maximum number of cells that are allowed to be sent at the Peak Cell Rate (PCR); and the Sustainable Cell Rate (SCR), the maximum average rate.

As used herein, and as commonly used in art, the Sustainable Cell Rate (SCR) corresponds to the expected rate of cell transmission across the network, and it is the SCR that is used as the nominal ATM channel rate. Accordingly, when the ATM channel involving the DSL Access Multiplexer 234 and the ATM network 118 is provisioned at step 308, parameters are chosen such that the SCR is set equal to the subscribed rate SR. Finally, at step 310, the DSL link and the ATM channel are enabled, allowing service to begin.

Figure 4:
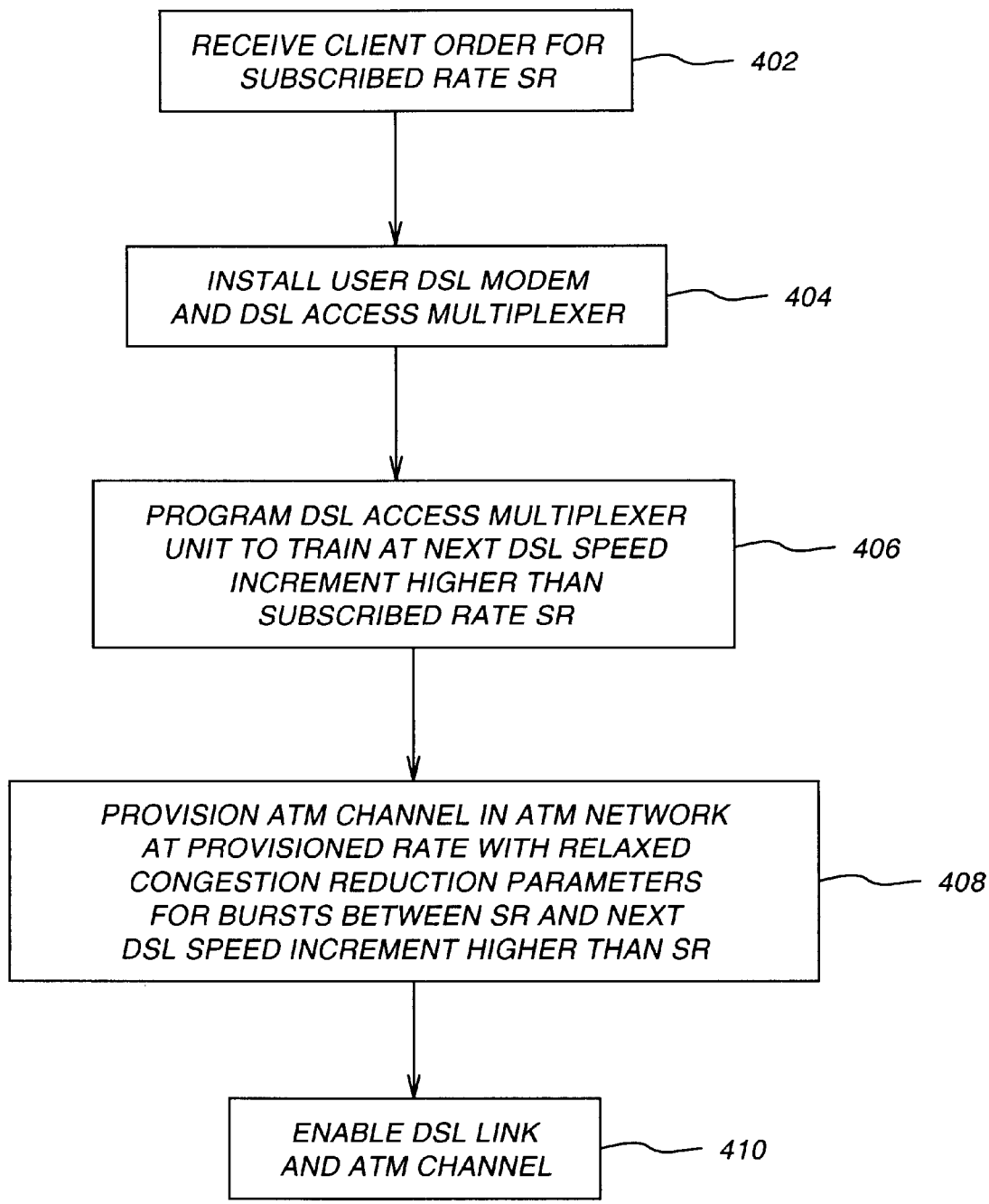
FIG. 4 shows steps for provisioning data access over digital subscriber line through a connection-oriented packet network in accordance with a preferred embodiment.

FIG. 4 shows steps for provisioning data access over digital subscriber line through a connection-oriented packet network in accordance with a preferred embodiment. The embodiment of FIG. 4 is directed to those circumstances in which the speed increments of the DSL Access Multiplexer 234 do not align with the subscribed rates SR. As shown in FIG. 4, steps 402 and 404 are performed in a manner similar to steps 302 and 304 of FIG. 3, respectively. At step 406, however, the DSL link is programmed to train at the first DSL speed increment greater than the subscribed rate SR.

As mentioned supra, when the DSL link is programmed to train at the first DSL speed increment (e.g., 400 Kbps) greater than the subscribed rate SR (e.g., 384 Kbps), congestion problems may occur when sufficient bursts of data are sent at a rate that lies between the two rates, causing retransmission delays in the higher protocol layers that may result in a throughput far less than the nominal subscribed rate SR at those times. In accordance with a preferred embodiment, at step 408 the ATM channel is provisioned with a nominal data rate of SR, but with relaxed congestion reduction parameters that reduce the number cells that are "bit-bucketed" when the congestion condition occurs for this ATM channel.

One exemplary method for relaxing the congestion reduction parameters in the ATM channel at step 408 involves the use of larger buffers at the ATM network switch 116, although other methods may be used. In this manner, there is less "punishment" to the client for the lack of alignment between DSL speed increments and subscription rates SR, which is a factor that is often beyond the client's technical control. Finally, at step 410, the DSL link and the ATM channel are enabled, allowing service to begin.

Figure 5:
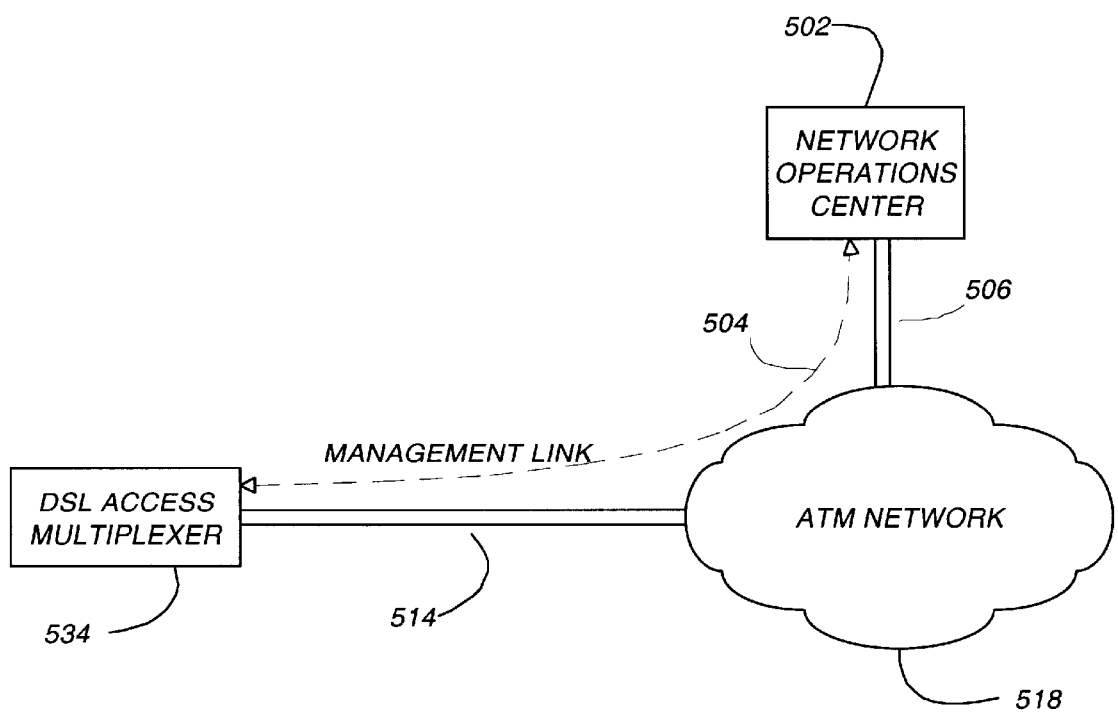
FIG. 5 shows a portion of a connection-oriented packet network in accordance with a preferred embodiment including a data link between a central office digital subscriber line terminal unit and a network operations center.

FIG. 5 shows a portion of a connection-oriented packet network in accordance with a preferred embodiment, including a DSL Access Multiplexer 534, an ATM network 518, and a Network Operations Center (NOC) 502. DSL Access Multiplexer 534 is coupled to the ATM network 518 through an ATM link 514, and NOC 502 is coupled to the ATM network 518 through an ATM link 506. NOC 502 generally comprises a network of computers used to provision and maintain services for the end-to-end service provider.

In accordance with a preferred embodiment, a two-way data link 504 is included between the DSL Access Multiplexer 534 and the NOC 502 for allowing readout and programming of DSL access multiplexer parameters from the NOC. The two-way data link 504 may take any of several forms in accordance with the preferred embodiments, including that of a separate connection to the NOC or as a part of a channel on a group of control connections between the CO and the NOC. Indeed, it is within the scope of the preferred embodiments to provide data link 504 in the form of a ATM channel between the DSL Access Multiplexer 534 and the NOC 502 across the ATM network 518, or for data link 504 to be a DS-1 circuit.

Figure 6:
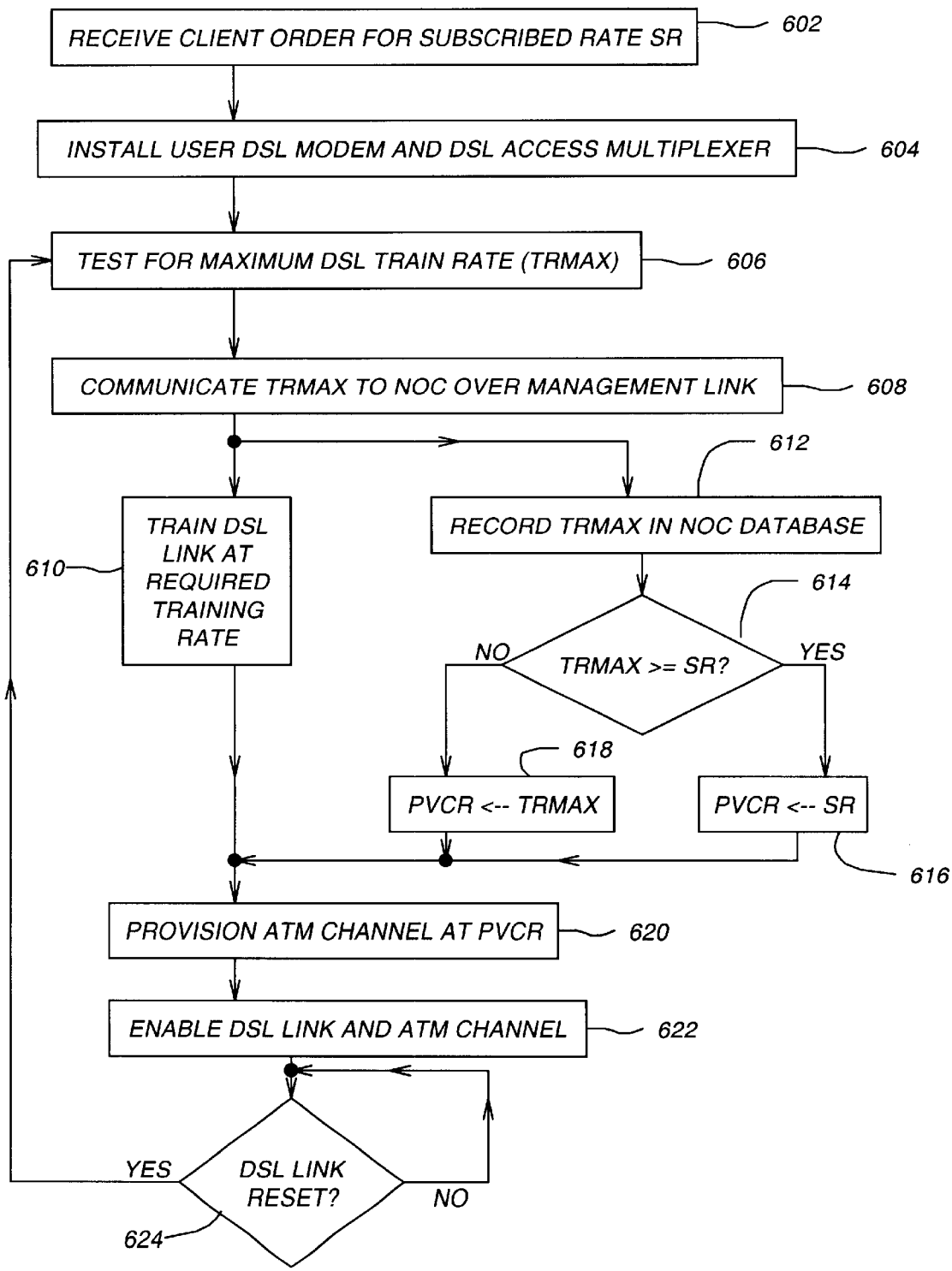
FIG. 6 shows steps for provisioning data access over digital subscriber line through a connection-oriented packet network in accordance with a preferred embodiment.

FIG. 6 shows steps for provisioning data access over digital subscriber line through a connection-oriented packet network in accordance with a preferred embodiment using the network shown in FIG. 5. As shown in FIG. 6, steps 602 and 604 are performed in a manner similar to steps 402 and 404 of FIG. 4. However, at step 606, instead of training up to a predetermined rate, the DSL Access Multiplexer 534 trains with remote DSL terminal unit 132 (e.g., a DSL Modem at the client premises) to a maximum actual training rate TRMAX.

Importantly, the training rate TRMAX is not a theoretical or historical value, but is rather the current maximum practical value under the present facility conditions. It may be greater, equal to, or less than its theoretical or historical values for any of a variety of reasons, such as rerouting of copper facilities by the telephone company, or the deactivation of an unrelated T1 circuit that lies in the same copper bundle as the DSL copper pair (thus reducing crosstalk and increasing DSL bandwidth). At step 608, the value TRMAX is transmitted to the NOC 502 over data link 504.

Subsequent to step 608, steps 610 and steps 612 are shown in FIG. 6 as being carried out in parallel, although the ordering of these parallel steps does not affect the operation of the preferred embodiments. At step 610, the DSL Access Multiplexer 534 trains with remote DSL terminal unit 132 at a required training rate. If TRMAX is less than the subscription rate SR, the required training rate is TRMAX. If TRMAX is greater than or equal to the subscription rate SR, the required training rate is set according to steps described supra in connection with step 306 of FIG. 3 or step 406 of FIG. 4.

At step 612, in accordance with the preferred embodiments, the value TRMAX is stored in a NOC database for future technical or commercial advantages. For example, the maximum allowable DSL data rate may be compared to the client's subscribed data rate and to the client's actual traffic usage patterns, permitting enhanced services to be offered to the client by marketing personnel when appropriate. Thus, if the client's subscribed rate SR is 192 Kbps but TRMAX is 768 Kbps, a marketing call may be made to the client to sell the additional bandwidth, especially if congestion reduction activity has been recently invoked on the client's ATM channel. As another example, knowledge of the maximum allowable DSL data rates for a plurality of client premises may be used for facility routing and community data planning applications. As yet another example, data regarding the maximum allowable DSL data rates for a plurality of client premises may be sold to interested parties, such as digital content providers, who would consider knowledge of available bandwidth to customer premises as a valuable marketing tool.

At step 614, the NOC determines whether the value TRMAX is greater than or equal to the subscribed rate SR. If yes, a variable PVCR (Permanent Virtual Circuit Rate) is set to the subscribed rate SR at step 616. If no, the variable PVCR is set to TRMAX at step 618. At step 620, the ATM channel involving the DSL Access Multiplexer 534 and the ATM network 118 is provisioned to a data rate corresponding to the value of PVCR. Advantageously, the steps 606–620 provide for the conservation of network resources in the event that the maximum trainable rate between DSL terminal units TRMAX has degraded to a value substantially below the subscribed data rate SR. This is because when the DSL link is trained to a rate less than the ATM channel, there will always be excess unused capacity in the ATM channel. Accordingly, it would be more efficient to allow allocation of this extra bandwidth to other ATM channels by reducing its nominal data rate.

At step 622, the DSL link and the ATM channel are enabled, allowing service to begin. In accordance with a preferred embodiment, however, at step 624 the NOC 502 continues to monitor the DSL Access Multiplexer 534 over the data link 504 to detect whether the DSL link has been interrupted or reset, either intentionally or accidentally, causing the need for retraining. As long as there is no resetting of the DSL link, no action is taken. However, if the DSL Access Multiplexer 534 has reset, it is instructed at step 606 to test for the maximum DSL training rate TRMAX possible as of the time of the retraining, and the provisioning steps 608–622 are repeated. Of course, if the rate TRMAX has not changed since the last resetting interval, the steps 614–618 may be skipped. Advantageously, the method of FIG. 6 provides for automatic updating of the maximum DSL training rate TRMAX whenever the DSL link resets, while also providing for the automated conservation of ATM network resources when the maximum DSL training rate TRMAX falls below the subscribed rate SR.

While their salient features have been described, these descriptions are merely illustrative and are not intended to limit the scope of the preferred embodiments. Indeed, the preferred embodiments are applicable to a wide variety of digital communications systems.

What is claimed is:

1. A method for provisioning a data connection between a client and a destination over a dedicated network having a digital subscriber line portion and a connection-oriented packet network portion, comprising the steps of:

receiving a subscribed data rate for the digital subscriber line;

provisioning a permanent virtual circuit channel across said connection-oriented packet network portion, said permanent virtual circuit channel being provisioned at a data rate corresponding to said subscribed data rate for the digital subscriber line; and instructing said digital subscriber line portion to train at a data rate not substantially greater than said subscribed data rate for the digital subscriber line, said digital subscriber line portion being capable of training at one of a plurality of data speed increments not aligned with said subscribed data rate, said trained data rate being selected to correspond to one of the lowest data speed increment greater than said subscribed data rate and the greatest data speed increment less than said subscribed data rate;

whereby congestion between said digital subscriber line portion and said connection-oriented packet network portion due to data rate mismatch therebetween is substantially avoided.

2. The method of claim 1, said permanent virtual circuit channel being an ATM channel, said trained data rate allowing for the possibility of a marginal congestion condition upon the occurrence of data bursts between said subscribed data rate and said trained data rate, wherein said ATM channel is provisioned using relaxed congestion reduction parameters that curb the numbers of ATM cells discarded upon the occurrence of said marginal congestion condition.

3. The method of claim 1, said digital subscriber line portion comprising a client digital subscriber line terminal unit, a central office digital subscriber line terminal unit, and a copper facility therebetween, said method further comprising the steps of:

instructing said central office digital subscriber line terminal unit to test for a maximum trainable rate between said central office digital subscriber line terminal unit and said client digital subscriber line terminal unit; and transmitting information related to said maximum trainable rate from said central office digital subscriber line terminal unit to a network operation center.

4. The method of claim 3, further comprising the step of, at said network operation center, recording said information related to said maximum trainable rate in a database, said database being configured to store current and historical maximum trainable rates for a plurality of client digital subscriber lines.

5. A method for provisioning a data connection between a client and a destination over a dedicated network having a digital subscriber line portion and a connection-oriented packet network portion, comprising the steps of:

receiving a subscribed data rate;

determining a maximum trainable rate of said digital subscriber line portion;

provisioning a permanent virtual circuit channel across said connection-oriented packet network portion at said subscribed data rate if said maximum trainable rate is greater or equal to than said subscribed data rate;

provisioning a permanent virtual circuit channel across said connection-oriented packet network portion at a data rate corresponding to said maximum trainable rate if said maximum trainable rate is less than said subscribed data rate, thereby releasing bandwidth for other permanent virtual circuit channels on said connection-oriented packet network that would have been unused had said permanent virtual circuit channel been provisioned at said subscribed data rate.

6. The method of claim 5, further comprising the step of instructing said digital subscriber line portion to train at a data rate not substantially greater than said subscribed data rate if said maximum trainable rate is greater or equal to than said subscribed data rate, whereby congestion between said digital subscriber line portion and said connection-oriented packet network portion due to data rate mismatch therebetween is substantially avoided.

7. The method of claim 6, further comprising the step of instructing said digital subscriber line portion to train at a data rate equal to said maximum trainable rate if said maximum trainable rate is less than said subscribed data rate.

8. The method of claim 7, further comprising the step of transmitting information related to said maximum trainable rate to a network operation center.

9. The method of claim 8, further comprising the steps of
enabling said digital subscriber line portion and said permanent virtual channel for activating said data connection; and
monitoring said digital subscriber line portion for detecting if said digital subscriber line portion has reset.

10. The method of claim 9, wherein if said digital subscriber line portion has reset, performing the steps of:
determining a subsequent maximum trainable rate of said digital subscriber line portion;
transmitting information related to said subsequent maximum trainable rate to said network operation center; and
if said subsequent maximum trainable rate is equal to the prior maximum trainable rate, instructing said digital subscriber line portion to train at a data rate equal to said prior maximum trainable rate.

11. The method of claim 10, wherein if said subsequent maximum trainable rate is different than the prior maximum trainable rate, performing the steps of:
reprovisioning said permanent virtual circuit channel across said connection-oriented packet network portion at said subscribed data rate if said subsequent maximum trainable rate is greater or equal to than said subscribed data rate; and
reprovisioning said permanent virtual circuit channel across said connection-oriented packet network portion at a data rate corresponding to said subsequent maximum trainable rate if said subsequent maximum trainable rate is less than said subscribed data rate, thereby releasing bandwidth for other permanent virtual circuit channels on said connection-oriented packet network that would have been unused had said permanent virtual circuit channel been provisioned at said subscribed data rate.

12. A method for provisioning a permanent data connection between a client premises and a destination over an ATM network that includes an xDSL link to the client premises, comprising the steps of:
receiving a subscribed data rate;
installing a remote DSL terminal unit at the client premises;
installing a Central Office ("CO") DSL terminal unit at a central office near said client premises and establishing a wired connection between the remote DSL terminal unit and the CO DSL terminal unit, said CO DSL terminal unit being capable of training at one of a plurality of data speed increments not aligned with said subscribed data rate, said trained data rate being selected to correspond to one of the lowest data speed increment greater than said subscribed data rate and the greatest data speed increment less than said subscribed data rate;
at a network operations center, provisioning an ATM channel between said CO DSL terminal unit and an ATM network switch near said destination, said ATM being provisioned at the subscribed rate;
installing a data link between the CO DSL terminal unit and the network operations center;
instructing said CO DSL terminal unit to test for a maximum trainable rate between said CO DSL terminal unit and said remote DSL terminal unit;
transmitting information related to said maximum trainable rate from said CO DSL terminal unit to the network operations center; and
activating said xDSL link and said ATM channel, wherein said activating said xDSL link comprises instructing said digital subscriber line portion to train at a data rate not substantially greater than said subscribed data rate, whereby congestion between said digital subscriber line portion and said connection-oriented packet network portion due to data rate mismatch therebetween is substantially avoided;
whereby said network operations center is capable of monitoring the status of said xDSL link using said data link to said CO DSL terminal unit.

13. The method of claim 12, said selected trained data rate causing the possibility of a marginal congestion condition upon the occurrence of data bursts between said subscribed data rate and said trained data rate, wherein said ATM channel is provisioned using relaxed congestion reduction parameters that curb the numbers of ATM cells discarded upon the occurrence of said marginal congestion condition.

14. The method of claim 13, wherein upon a detection of a resetting of the CO DSL terminal unit, further steps are performed comprising the steps of:
determining a subsequent maximum trainable rate of said digital subscriber line portion;
transmitting information related to said subsequent maximum trainable rate to said network operation center;
if said subsequent maximum trainable rate is equal to the prior maximum trainable rate, instructing said digital subscriber line portion to train at a data rate equal to said prior maximum trainable rate;
if said subsequent maximum trainable rate is different from the prior maximum trainable rate, performing the steps of:
reprovisioning a permanent virtual circuit channel across said connection-oriented packet network portion at said subscribed data rate if said subsequent maximum trainable rate is greater or equal to than said subscribed data rate;
reprovisioning a permanent virtual circuit channel across said connection-oriented packet network portion at a data rate corresponding to said subsequent maximum trainable rate if said subsequent maximum trainable rate is less than said subscribed data rate, thereby releasing bandwidth for other permanent virtual circuit channels on said connection-oriented packet network that would have been unused had said permanent virtual circuit channel been provisioned at said subscribed data rate;

instructing said digital subscriber line portion to train at a data rate not substantially greater than said subscribed data rate if said subsequent maximum trainable rate is greater or equal to than said subscribed data rate; and instructing said digital subscriber line portion to train at a data rate equal to said subsequent maximum trainable rate if said subsequent maximum trainable rate is substantially less than said subscribed data rate.

15. The method of claim 12, further comprising the step of, at said network operation center, recording said information related to said maximum trainable rate in a database, said database being configured to store current and historical maximum trainable rates for a plurality of client digital subscriber lines.

* * * * *